United States Patent

[11] 3,588,345

[72] Inventor Herbert Dym
 Mahopac, N.Y.
[21] Appl. No. 720,723
[22] Filed Apr. 11, 1968
[45] Patented June 28, 1971
[73] Assignee International Business Machines
 Corporation
 Armonk, N.Y.

[54] POSITION TRANSDUCER USING A SWEEPING FIELD NULL
9 Claims, 13 Drawing Figs.

[52] U.S. Cl. .................................................. 178/18
[51] Int. Cl. .................................................. G08c 21/00
[50] Field of Search ........................................ 178/18, 19;
 250/201, 202, 203; 340/347; 343/5

[56] References Cited
UNITED STATES PATENTS
| | | | |
|---|---|---|---|
| 3,399,401 | 8/1968 | Ellis et al. | 178/18 |
| 3,440,643 | 4/1969 | Teager | 340/347 |
| 3,480,830 | 11/1969 | Horton et al. | 317/235 |

*Primary Examiner*—Kathleen H. Claffy
*Assistant Examiner*—T. L. Kundert
*Attorney*—Sughrue, Rothwell, Mion, Zinn and Macpeak ABSTRACT: The position of a capacitive probe on a writing tablet is converted into digital and analogue signals by detecting the time at which a voltage null passes the capacitive probe. A voltage null is swept along one dimension of the writing tablet by applying a pair of equal frequency out-of-phase signals, which are amplitude modulated to provide equal rates of increase and decrease, respectively, to the opposite ends of a resistor placed along the dimension to be measured. The null moves linearly across the tablet along the dimension to be measured. The output from the capacitive probe is a waveform having an envelope which reduces to a null at one point during each sweeping period. The time difference between the start of the sweep and the occurrence of the null is a measure of the position of the capacitive probe along the dimension to be measured. Two dimensional measurements can be accomplished by sweeping the null along the surface in a pair of orthogonal directions, using either a time multiplexing technique, wherein the null is swept along a single dimension at a time, or a frequency multiplexing technique, wherein the carrier frequencies used to sweep the null along the orthogonal dimensions are different frequencies.

PATENTED JUN28 1971

INVENTOR
HERBERT DYM

BY
Sughrue, Rothwell, Mion
Zinn & Macpeak
ATTORNEYS

POSITION TRANSDUCER USING A SWEEPING FIELD NULL

BACKGROUND OF THE INVENTION

Position transducers in the form of writing tablets having means for converting the pen position into electrical position signals are known in the prior art. Apparatus of this nature is useful in providing graphic inputs to computers and as part of character recognition systems. Generally, electrical signals are applied to the writing surface by means of resistive layers or resistors in combination with grid lines. The signals are operated upon so that the signal detected by a probe at any given position on the writing tablet will have some measurable relation to the position of the probe. In accordance with one known prior art technique, a pair of in-phase equal frequency carrier signals are modulated by equal frequency out-of-phase sign waves and applied to opposite ends of a resistor placed along the dimension to be measured. The sum signal detected by the capacitive probe at any point along the dimension has a phase dependent upon the probe position. One of the difficulties with the phase detection prior art apparatus is that there is a nonlinearity of phase with position and this is difficult to correct. Furthermore, in order to achieve a digital output in the phase detection system it is necessary to have an extremely precise clock frequency.

SUMMARY OF THE PRESENT INVENTION

The present invention provides a signal which is linear with position and which provides an accurate digital output even though the clock frequency may drift. In accordance with the present invention, modulated carrier signals are applied to opposite ends of a resistor or resistive layer. The carrier signals at the opposite ends are equal in frequency but out-of-phase and the modulating signals are linear ramps which vary in opposite directions at the same rate. Thus, during each period of the ramp frequency a voltage null is swept across the tablet linearly with time and the detection of the voltage null in the output of the capacitive probe provides a time measurement of the position of the probe.

DETAILED DESCRIPTION OF THE DRAWINGS

Figure 1:
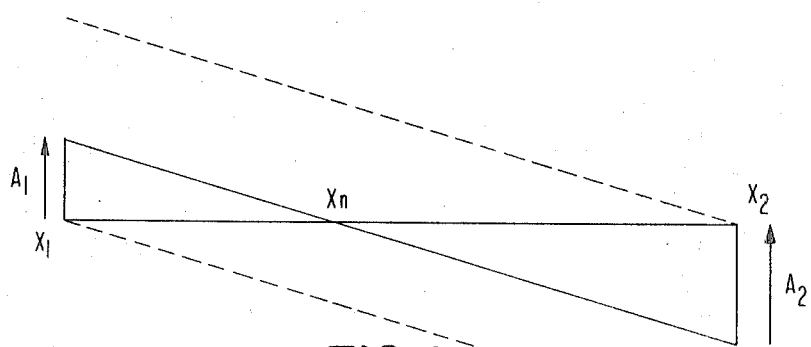
FIG. 1 is a graph of AC amplitude distribution along a resistor.

The graph of FIG. 1 illustrates generally how a voltage null is swept along one dimension of a resistor. The solid horizontal line represents the length of a resistor having end points $X_1$ and $X_2$. The vertical direction or axis represents the amplitude of the AC signal at any point on the resistor. As can be seen, if a voltage having amplitude $A_1$ is applied at terminal $X_1$ and a voltage having amplitude $A_2$ is applied at terminal $X_2$ with opposite polarity, a voltage null will be created at $X_n$. If the amplitude $A_1$ is then increased at the same rate that the amplitude $A_2$ is decreased, the null point $X_n$ will move from left to right linearly with time across the resistor between points $X_1$ and $X_2$. The dashed lines below and above the horizontal line represent the amplitude distribution at the beginning and end of a single sweep. In order to create a signal which sweeps along a dimension as indicated and which can be picked up by a capacitive probe, it is necessary that alternating current signals be used and that the two signals applied to the end points of the resistor be of opposite polarity (out-of-phase). This criteria is satisfied in accordance with the present invention by using ramp modulated equal frequency but out-of-phase carrier signals at the end points. The signal at one end point has an AC amplitude which increases linearly with time during a single sweep period and the other end point receives a signal which decreases linearly with time during a single sweep period, the rates of increase and decrease being identical.

If $X_1$ is considered to be the zero position along the X axis, then the X-axis position of a capacitive probe is measured by detecting the time difference between the start of a sweep, when the null is at the zero position, and the time at which the probe detects a null.

Figure 2:
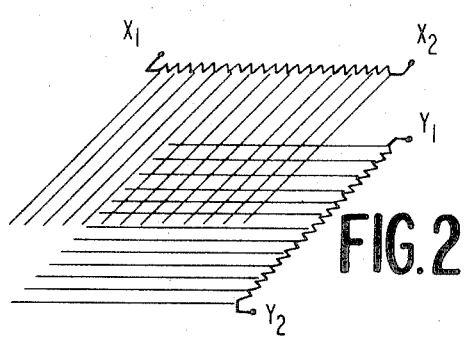
FIG. 2 is an illustration of a grid structure which may be used to connect the signals to the tablet.

The sweeping field null can be made to exist over a two-dimensional surface. This can be done simply by extending the single resistor into a resistive sheet and using existing techniques for applying signals on coordinate axes, or as shown in FIG. 2, by connecting a first set of grid lines to an X-axis resistive bleeder having end points $X_1$ and $X_2$, and connecting a second coordinate set of grid lines to a Y-axis resistive bleeder having end points $Y_1$ and $Y_2$. The two sets of grid lines may be isolated by a thin insulation layer and the pair may be isolated from the writing surface or other tablet surface by a thin layer of insulating material. With two sweeping null lines orthogonal to one another, the complete two-dimensional position of a capacitive probe can be determined.

Figure 3:
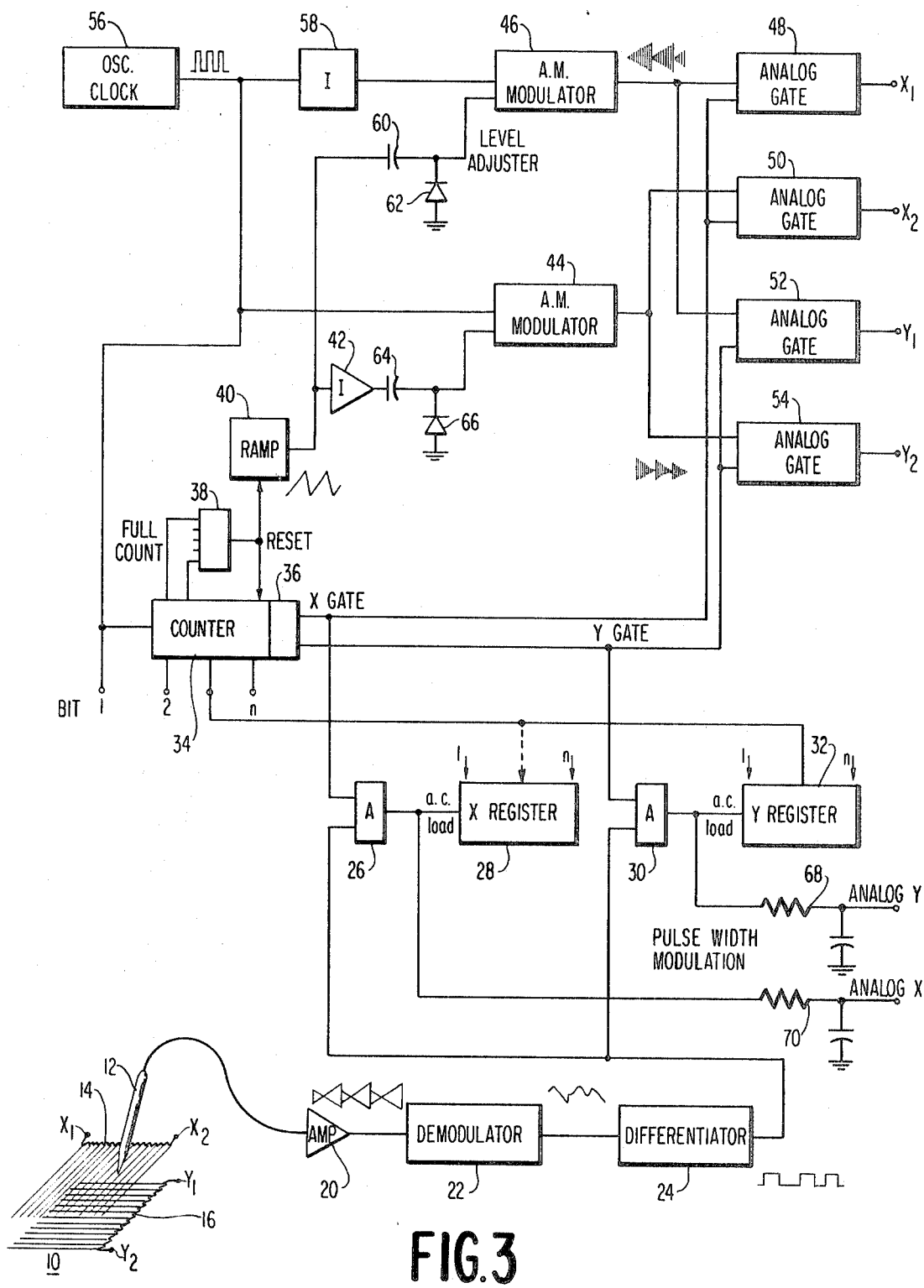
FIG. 3 is a block diagram of a preferred embodiment of the present invention.

Referring to FIG. 3, there is shown a preferred embodiment for achieving a two-dimensional sweeping field null along the surface of a tablet having an X-axis bleeder resistor 14 with grid lines (not shown) and a Y-axis bleeder resistor 16 with grid lines (not shown). Clock oscillator 56 produces a carrier frequency shown in FIG. 4c, which is applied directly to amplitude modulator 44 and via inverter 58 to the amplitude modulator 46. Thus, the carrier frequencies applied to the amplitude modulators are 180° out of phase. The carrier frequency is also applied to a counter 34 which operates in a known manner to count the cycles of the input signal. A binary counter may be used. A decoding AND gate 38, which is responsive to a full count being achieved in counter 34 provides a reset output which resets the counter 34 to zero and also resets a ramp generator 40.

Figure 4A:
FIGS. 4A—E and 5A—E are waveform diagrams, helpful in understanding the block diagram shown in FIG. 3.
Figure 4B:
Figure 4C:
Figure 4D:
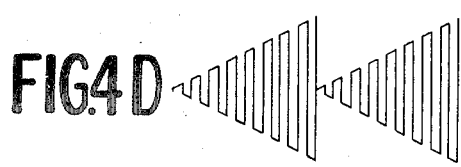
Figure 4E:
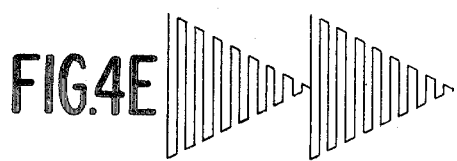

Ramp generator 40 provides an output, indicated in FIG. 4a, which is applied to amplitude modulator 46 via a level adjuster comprising capacitor 60 and diode 62. The ramp is also inverted in inverter 42 and applied to amplitude modulator 44 via a level adjuster comprising capacitor 64 and diode 66. The inverted and level adjusted ramp is indicated in FIG. 4b. Thus, each of the identical amplitude modulators 46 and 44 receive equal high frequency signals which are 180° out-of-phase and low frequency ramp voltages which vary in opposite directions at the identical rate. Amplitude modulators 46 and 44 are of a type which will provide 100 percent modulation of a carrier. This is indicated schematically by the level adjusting capacitor-diode networks 60, 62 and 64, 66, which hold the minimum points of the input wave forms at fixed levels. If the levels are adjusted to the point where the amplitude of the carrier is reduced to zero then regardless of input amplitude or wave shape of the modulating signal 100 percent modulation will be obtained. The output wave forms from the modulators are illustrated in FIGS. 4d and 4e, respectively. Since the capacity of binary counter 34 determines the ramp period, the ramp period or time it takes for the voltage null to be swept across the bleeder resistor is an integral multiple of the clock period. Since the counter is reset to zero at the same time the ramp starts, the counter always contains a digital indication of the time since the ramp started, which is also proportional to the instantaneous position of the voltage null along either axis.

In order to provide time multiplexing of the sweeping null, one additional binary stage 36 is added to the binary counter 34. The reset output from decoding AND gate 38 is wired in a well-known manner to reset all stages of the counter with the exception of stage 36 at reset time. Thus, during any one ramp period one of the output lines from stage 36 will contain a voltage level which can be used as a gating voltage, and the output line which contains the aforesaid voltage level will be alternated every period of the ramp wave form. Thus, during a first period the X gate output from stage 36 energizes analog gates 48 and 50 to allow a single period of waveforms 4d and 4e to be applied to the $X_1$ and $X_2$ terminals, respectively. During alternate periods of the ramp waveforms the Y-gate output from stage 36 energizes analog gates 52 and 54 to enable wave forms 4d and ee to be connected to terminals Y1 and Y2 of bleeder resistor 16.

Figure 5A:
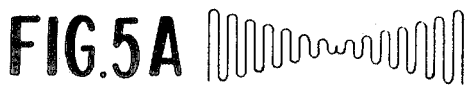
Figure 5B:
Figure 5C:
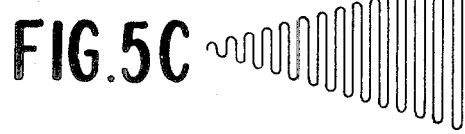

Capacitive probe 12 is placed on or near the surface of tablet 10 and provides an output signal to amplifier 20, demodulator 22, and differentiator 24. The output from probe 12 will be in the form of an amplitude modulated carrier frequency having a null at a time dependent upon the position of the capacitor probe. For example, FIGS. 5a, 5b and 5c illustrate different outputs from a capacitive probe during a single ramp period with the probe being at three different points along the dimension being measured. FIG. 5a illustrates the output wave form occurring when the capacitive probe is exactly at the midpoint of the dimension being measured, and FIGS. 5b and 5c illustrate the output wave forms resulting from the capacitive probe being at the opposite terminals, respectively, where the signals are being applied to the bleeder resistor. The demodulator 22 removes the high frequency carrier and provides just the amplitude modulation envelope at its output. As the field null sweeps past the probe the carrier amplitude will decrease and then increase linearly. The detected amplitude envelope is then fed into a differentiator which operates as a binary circuit indicating a positive or a negative slope. When a null passes, causing the slope to change polarity, the differentiator switches state and its output at that time satisfies one of the AND circuits 26 and 30. The other inputs to the AND circuits 26 and 30 are from the two outputs of binary stage 36. Thus, AND circuit 26 will be operative during the time that the null is swept along the X-direction of the tablet and AND circuit 30 will be operative during the time that the null is swept along the Y-direction of the tablet. When the null is detected by the differentiator causing it to change state, an output from the operative AND circuit gates the contents of counter 34 into either X register 28 or Y register 32. The digital quantity gated into the X and Y registers are digital measurements of the X and Y positions of the probe.

In addition, the output of the AND circuit, which is a pulse width modulated signal proportional to the probe position, is integrated by the resistor capacitor combination 68 or 70 to provide analogue outputs proportional to the probe position.

Figure 5D:
Figure 5E:

One example of an envelope output from demodulator 22 is indicated in FIG. 5d along with a corresponding differentiator output indicated in FIG. 5e. The demodulator used may be one which provides either positive or negative envelope detection. The negative envelope is illustrated in FIG. 5d.

One of the advantages of the sweeping field null approach described herein is that it is not sensitive to the amplitude of the signal picked up by the probe. Thus, coupling variations have no effect. Also, the signal need not go to zero as the null sweeps by since it is only slope reversal (or phase reversal) that is detected. Thus, some phase shift in the carrier can also be tolerated. However, when this occurs the so-called null is not really a voltage null but is a point of voltage slope reversal, which is also satisfactory.

Although the two dimensional sweep is operated on a time division multiplex scheme, as indicated in FIG. 3, it may also be carried out in accordance with a frequency division multiplex scheme. In accordance with the latter, the signals would be applied to the X and Y resistors at the same time but different carrier frequencies would be used and filters would be provided in the output of the amplifier 20 in order to separate the X-axis null from the Y-axis null.

Also, it should be noted that by reducing the percentage modulation of the carrier the region swept over by the null is reduced by a proportional amount. This can be useful, for example, in cases where nonlinearity in the field distribution caused by edge affects requires confining the active region.

While the invention has been particularly shown and described with reference to preferred embodiments thereof, it will be understood by those skilled in the art that various changes in form and details may be made therein without departing from the spirit and scope of the invention.

I claim:

1. A position transducer for detecting position of a probe in at least one dimension on a surface comprising first means for periodically sweeping a point of voltage slope reversal across said surface along said one dimension, means adapted to receive the output of said probe capacitively coupled to said surface for converting the time difference between a point of voltage slope reversal and the start of said sweep into a position representative signal.

2. A position transducer as claimed in claim 1 wherein said position representative signal is voltage amplitude proportional to said time difference.

3. A position transducer as claimed in claim 1 wherein said position representative signal is a digital quantity proportional to said time difference.

4. A position transducer as claimed in claim 1 further comprising second means for sweeping a point of voltage slope reversal across said surface along a second dimension substantially orthogonal to said one dimension and multiplexed with said first dimension to enable separate detection of said probe position along said first and second dimension.

5. A position transducer as claimed in claim 4 wherein said first means for sweeping comprises means for generating first and second out-of-phase carrier frequencies, amplitude modulation means for modulating said first and second carriers to provide first and second outputs, respectively, having amplitude envelope slopes of opposite polarity and equal magnitude, a resistor means connected to said surface along said one dimension and means for connecting said first and second outputs to opposite ends of said resistor during first periods.

6. A position transducer as claimed in claim 5 wherein said second means for sweeping comprises a second resistor means connected to said surface along said second dimension and means for connecting said first and second outputs to opposite ends of said resistor during second periods different from said first periods.

7. Apparatus for connecting the position of a capacitive probe on a tablet, having resistive means for connecting signals thereto, into electrical indications of position comprising a. means for generating first and second equal frequency out-of-phase carrier signals, b. digital counter means for counting the cycles of said carrier signals, c. means responsive to said counter reaching a predetermined count for resetting said counter to an initial condition and for generating a sawtooth wave form having a period equal to the time interval between consecutive resetting of said counter, d. inversion means responsive to said sawtooth wave form for generating an inverted sawtooth wave form of identical period and polarity as said sawtooth wave form but of opposite slope, e. first modulating means for amplitude modulating one of said carrier signals by said sawtooth wave form forming a first modulated carrier, f. second modulating means for amplitude modulating the other of said carrier signals by said inverted sawtooth wave form forming a second modulated carrier, g. means for connecting said first and second modulated carriers to opposite ends of said resistive means to create a voltage along the dimension between said opposite ends having a point of slope reversal which travels from one end to the other during a single sawtooth period whereby said capacitive probe contains at its output a carrier having an envelope wave form with a point of slope reversal occurring each time said point of voltage slope reversal passes the position of said probe, h. means responsive to the output of said probe for generating a pulse having a time duration equal to the time it takes said point of slope reversal to travel from one end point to the position of said probe, and i. means responsive to the termination of said pulse for transferring the count in said counter to an output.

8. Apparatus as claimed in claim 7 further comprising means for converting the time duration of said pulse into a proportional amplitude.

9. Apparatus as claimed in claim 8 further comprising time multiplexing means for periodically connecting said modulated carrier to ends of a resistive means associated with said tablet to cause said point of voltage null to sweep across said tablet in an orthogonal direction.